UNITED STATES PATENT OFFICE.

HERMAN DAVIS, OF DAYTON, NEVADA.

PROCESS OF EXTRACTING PRECIOUS METALS FROM THEIR ORES.

SPECIFICATION forming part of Letters Patent No. 692,634, dated February 4, 1902.

Application filed July 17, 1901. Serial No. 68,651. (No specimens.)

*To all whom it may concern:*

Be it known that I, HERMAN DAVIS, a citizen of the United States, residing at Dayton, in the county of Lyon and State of Nevada, have invented new and useful Improvements in Processes of Extracting Precious Metals from Their Ores, of which the following is a specification.

My invention relates principally to the effecting of a solution of the precious and other metals in ores by first converting these metals into chlorids and then dissolving and leaching them from the ore with a solution of a cyanid of the alkali or alkali-earth metals.

It is well known that silver-bearing ores cannot be successfully treated by the method of extraction known as the "chlorination process." The silver in the ore is converted into a silver chlorid, which is insoluble in chlorin-water, and consequently remains undissolved in the crushed ore after treatment. It is also a familiar fact that ores high in silver are seldom amenable to treatment by cyanid, the action of cyanogen-bearing solutions on such silver ores often being erratic and uncertain and the percentage of extraction low, caused principally by the weak affinity cyanogen bears for silver. By my improved process the precious metals can be almost wholly extracted from such silver-bearing ores.

The essence of my process consists in the principle of converting the metallic gold and silver into chlorids by introducing chlorin gas into the tank or other containing-receptacle until sufficiently saturated. Afterward, according to the nature of the ore, it may be found advisable to expel a part or all the free chlorin gas present by forcing air through the ore or any other convenient process for accomplishing the result. Following this a solution of an alkaline cyanid is added to dissolve the now-readily-soluble silver chlorid and also to convert the chlorid of gold into gold-potassium cyanid. These readily-soluble cyanids are leached from the ore by the addition of more cyanid solution and final washing with water. With certain ores the driving-out of the chlorin gas may be omitted, as in some instances it may be advisable to expel very little or none of the chlorin. The method of procedure must of course always be adapted to the nature of the ore under treatment. In general I have found it advisable to remove any excess of chlorin. The air for this purpose is introduced under or above the filter until a sufficient volume has been forced through the material under treatment to displace what chlorin gas it is desirable to remove. This aeration prevents a high decomposition of cyanid, which would be due to the action of free chlorin, and appears the simplest mode of treatment.

The precious metals in the solution may be precipitated electrolytically or upon metallic zinc or by any of the methods applicable to dilute cyanid solutions containing metals in solution.

The chemical action which takes place in the process seems to be supported by the following equations: The chlorin acts upon the gold to form chlorid of gold:

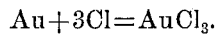

$$Au + 3Cl = AuCl_3.$$

The gold chlorid is then acted upon by the cyanid solution to form a double gold-potassium cyanid:

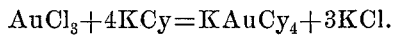

$$AuCl_3 + 4KCy = KAuCy_4 + 3KCl.$$

It is seen that this reaction gives the higher gold-potassium cyanid, ($KAuCy_4$.) This form of gold-potassium cyanid is probably more stable than $KAuCy_2$, which is believed to be the molecular formula of gold-potassium cyanid that occurs when metallic gold is treated by cyanid solutions. Results in practice indicate that the higher cyanid is formed when gold chlorid is treated with aqueous solutions of the alkaline cyanids. This higher double cyanid of gold and potassium being more stable than the lower in series is in less danger of being broken up and precipitated by base metals in the pulp before the solution passes out of the tank. This precipitation probably is what takes place in leaching some varieties of refractory ores with alkaline cyanid solutions alone, and it is one of the principal causes of low extraction of gold and silver by the cyanid process. The effect upon the silver seems to be quite definite, and it is this action which gives the process its great value.

Silver chlorid is formed as follows:

$$2Ag + 2Cl = 2AgCl.$$

Silver chlorid (AgCl) is very soluble in all alkaline cyanids, and consequently is dissolved when it comes in contact with a solution of potassium cyanid or other suitable cyanids.

The efficiency of this process when applied to certain silver-bearing ores has been thoroughly demonstrated. Mill-tailings which left fifty-five and one-half per cent. of their assay value in the pulp after ordinary cyanid treatment under the most favorable conditions were made by this dual treatment to yield all but six and one-half per cent. of their gold and silver, while the recovery of mercury, always an important factor in the cyaniding of old mill-tailings, was correspondingly increased.

When compared with the high extraction, the difference in consumption of cyanid was so small as to be hardly worthy of consideration. That this method is a commercial success has been demonstrated at the Nevada Reduction Works, at Dayton, Nevada, where old Comstock mill-tailings which had successively resisted treatment by chlorination, cyanid, and other leaching processes are now being successfully treated by my invention, which I now desire to protect by Letters Patent.

Having thus described my invention, what I claim, and desire to secure by Letters Patent, is—

1. A process for the extraction of the precious and other metals from ore, ore-pulp, sands, slimes, tailings, mineral-bearing earths or other substances containing these metals, which consists in applying chlorin gas or chlorin-water to change the metals into chlorids, then removing a portion of the free chlorin by the application of air, and lastly leaching out the chlorids with a solution of a cyanid of the alkali or alkali-earth metals, substantially as described.

2. A process for the extraction of the precious and other metals from ore, ore-pulp, sands, slimes, tailings, mineral-bearing earths or other substances containing these metals which consists in introducing chlorin gas into the ore and afterward wholly or partially removing the excess of chlorin by forcing air into the material and afterward treating with a cyanid solution to dissolve the chlorids, substantially as described.

In testimony whereof I have hereunto set my hand in presence of two subscribing witnesses.

HERMAN DAVIS.

Witnesses:
J. E. GIGNOUX,
ALFRED MERRITT SMITH.